(12) United States Patent
Walsh, Jr.

(10) Patent No.: US 8,701,338 B1
(45) Date of Patent: Apr. 22, 2014

(54) AUTOMATED VACUUM-BASED PEST CONTROL SYSTEM

(76) Inventor: Norman Walsh, Jr., Kingston, WA (US)

(*) Notice: Subject to any disclaimer, the term of this patent is extended or adjusted under 35 U.S.C. 154(b) by 357 days.

(21) Appl. No.: 13/205,705

(22) Filed: Aug. 9, 2011

(51) Int. Cl.
*A01M 1/06* (2006.01)

(52) U.S. Cl.
USPC .......................................................... 43/139

(58) Field of Classification Search
USPC .......................................................... 43/139
See application file for complete search history.

(56) References Cited

U.S. PATENT DOCUMENTS

| | | | | |
|---|---|---|---|---|
| 959,155 | A * | 5/1910 | Nault | 43/139 |
| 1,006,271 | A * | 10/1911 | Powers | 43/139 |
| 1,071,620 | A * | 8/1913 | Kingsland | 43/139 |
| 1,226,641 | A * | 5/1917 | Cushing | 43/60 |
| 1,302,160 | A * | 4/1919 | Hedrich et al. | 43/131 |
| 1,348,449 | A * | 8/1920 | Rodgers et al. | 43/81 |
| 2,655,759 | A * | 10/1953 | Cronberger | 43/60 |
| 3,750,327 | A * | 8/1973 | Thybault | 43/139 |
| 4,062,142 | A | 12/1977 | Marotti | |
| 4,141,174 | A * | 2/1979 | Smith | 43/139 |
| 4,400,904 | A * | 8/1983 | Baker | 43/131 |
| 4,566,218 | A | 1/1986 | Kurosawa et al. | |
| 4,625,453 | A * | 12/1986 | Smith | 43/139 |
| 4,683,673 | A * | 8/1987 | Taylor | 43/139 |
| 4,768,305 | A * | 9/1988 | Sackett | 43/61 |
| 4,979,327 | A * | 12/1990 | Harris | 43/61 |
| 5,040,326 | A * | 8/1991 | Van Dijnsen et al. | 43/139 |
| 5,175,957 | A * | 1/1993 | West | 43/61 |
| 5,185,953 | A | 2/1993 | Gross | |
| 5,305,495 | A * | 4/1994 | Nelsen et al. | 43/139 |
| 5,400,543 | A * | 3/1995 | Ideker, Jr. | 43/139 |
| 5,452,539 | A * | 9/1995 | Kurosawa et al. | 43/58 |
| 5,564,221 | A * | 10/1996 | Henriques | 43/61 |
| 5,720,125 | A * | 2/1998 | Oviatt | 43/61 |
| 5,809,688 | A * | 9/1998 | Wallen | 43/61 |
| 5,915,950 | A * | 6/1999 | Kleinhenz | 43/139 |
| 5,926,997 | A * | 7/1999 | Wilcox | 43/139 |
| 6,029,392 | A | 2/2000 | Relf | |
| 6,568,125 | B2 * | 5/2003 | Kleinhenz | 43/139 |
| 6,865,843 | B1 * | 3/2005 | Jordan, Sr. | 43/139 |
| 6,901,694 | B1 * | 6/2005 | Neault et al. | 43/131 |
| 6,910,300 | B1 * | 6/2005 | Warren | 43/131 |
| D518,138 | S | 3/2006 | Burke | |
| 2004/0088903 | A1 * | 5/2004 | Poche | 43/61 |
| 2005/0028428 | A1 * | 2/2005 | Wills | 43/60 |

FOREIGN PATENT DOCUMENTS

| | | | | | |
|---|---|---|---|---|---|
| JP | 11028041 | A * | 2/1999 | | A01M 1/06 |
| JP | 11103747 | A * | 4/1999 | | A01M 1/08 |
| JP | 2003169583 | A * | 6/2003 | | A01M 1/06 |
| JP | 2003235427 | A * | 8/2003 | | A01M 1/06 |
| JP | 2004041130 | A * | 2/2004 | | A01M 1/06 |
| JP | 2008263875 | A * | 11/2008 | | A01M 1/06 |

* cited by examiner

*Primary Examiner* — Darren W Ark
(74) *Attorney, Agent, or Firm* — Kyle A. Fletcher, Esq.

(57) ABSTRACT

The automated vacuum-based pest control system features a clear tube into which a sensing means and baiting means are located sequentially along the length of the tube. The tube attaches to the hose of an existing vacuum cleaner, and upon turning on said vacuum cleaner shall suck in and trap a pest allured via the bating means. The vacuum system includes a waste bin, which can be accessed to remove the trapped pest regardless of whether the pest is exterminated or relocated. The sensing means includes a plug that plugs into a standard wall outlet and is wired engaged to a switch that turns on or off the vacuum cleaner upon detection of a pest via the sensing means.

13 Claims, 4 Drawing Sheets

AUTOMATED VACUUM-BASED PEST CONTROL SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of mouse traps and pest control, more specifically, a pest control system that employs the use of a vacuum to trap pests for disposal.

B. Discussion of the Prior Art

As will be discussed immediately below, no prior art discloses an automated pest control system that works with and controls the use of an existing vacuum cleaner; wherein the pest control system features a tube of an undefined length upon a first entrance at a predefined distance is located a sensing means that is adjacently located to a baiting means; wherein a second entrance is located at a distal end of the tube with the first entrance; wherein the second entrance attaches to a hose of the vacuum cleaner; upon sensing of a pest that is drawn into the tube via the bating means, the vacuum cleaner is turned on pest into the waste bin of the vacuum cleaner for subsequent disposal.

The Jordan, Sr. patent (U.S. Pat. No. 6,865,843) discloses a portable electric mouse trap in the shape of a cat; wherein the device includes a collection chamber, a motion sensor, a retractable gate, and a vacuum device. However, the portable electric mouse trap is not a pest control that can attach to and operate an existing shop-styled vacuum so as not to require a vacuum within the mouse trap.

The Kurosawa et al. patent (U.S. Pat. No. 5,452,539) discloses an apparatus for trapping rats with an air flow duct. However, the apparatus is not simply a pest trap that attaches to and works with an existing shop-styled vacuum in order to collect pests therein.

The Gross patent (U.S. Pat. No. 5,185,953) discloses a rodent trap with a launching mechanism for ejecting a rodent through an opening in the top of a housing. However, the rodent trap does not work with and control an existing vacuum to trap a rodent upon detection by a sensing means located in a tube that connects with the vacuum hose.

The Van Dijnsen et al. patent (U.S. Pat. No. 5,040,326) discloses a system for detecting and capturing pest, such as mice and rats, by a suction unit. Again, the system is not adapted for use with an existing vacuum and of which detects the presence of a pest before operating a vacuum cleaner to vacuum out the pest therein.

The Kurosawa et al. patent (U.S. Pat. No. 4,566,218) discloses an apparatus for automatically trapping and processing rats whereby the device includes a collection tube and a suction unit, and wherein the rat is killed by gas in the collection tube. However, the apparatus does not work and control an existing vacuum cleaner, and is dedicated to killing the caught pest as opposed to trapping for subsequent release.

The Marotti patent (U.S. Pat. No. 4,062,142) discloses a trapping and killing apparatus for mice and other animals. Again, the apparatus is not suited for use with an existing vacuum cleaner, and upon sensing to the presence of a pest, shall operate the vacuum so as to trap said pest within the vacuum cleaner.

The Wills patent application Publication (U.S. Pub. No. 2005/0028428) discloses a vacuum motor that draws rats into a conduit system. Again, the system is not suited for use with an existing vacuum cleaner to operate said vacuum upon detection of a pest to be caught therein.

The Oviatt patent (U.S. Pat. No. 5,720,125) discloses a disposable mouse trap that includes a plastic tube and ping pong ball. However, the mouse trap does not work with an existing vacuum cleaner.

The Relf patent (U.S. Pat. No. 6,029,392) discloses a tubular shaped rodent trap. However, the mouse trap does not work with an existing vacuum cleaner.

The Burke patent (U.S. pat. No. Des. 518,138) illustrates an ornamental design for a transparent live-capture mouse trap, which does not work with an existing vacuum cleaner.

While the above-described devices fulfill their respective and particular objects and requirements, they do not describe an automated pest control system that works with and controls the use of an existing vacuum cleaner; wherein the pest control system features a tube of an undefined length upon a first entrance at a predefined distance is located a sensing means that is adjacently located to a baiting means; wherein a second entrance is located at a distal end of the tube with the first entrance; wherein the second entrance attaches to a hose of the vacuum cleaner; upon sensing of a pest that is drawn into the tube via the bating means, the vacuum cleaner is turned on thereby generating a vacuum within the tube, which sucks the pest into the waste bin of the vacuum cleaner for subsequent disposal. In this regard, the automated vacuum-based pest control system departs from the conventional concepts and designs of the prior art.

SUMMARY OF THE INVENTION

The automated vacuum-based pest control system features a clear tube into which a sensing means and baiting means are located sequentially along the length of the tube. The tube attaches to the hose of an existing vacuum cleaner, and upon turning on said vacuum cleaner shall suck in and trap a pest allured via the bating means. The vacuum system includes a waste bin, which can be accessed to remove the trapped pest regardless of whether the pest is exterminated or relocated. The sensing means includes a plug that plugs into a standard wall outlet and is wired engaged to a switch that turns on or off the vacuum cleaner upon detection of a pest via the sensing means.

An object of the invention is to provide a pest control system that can trap mice, rats, moles, gerbils, chipmunks and other like-sized pests through the use with an existing vacuum cleaner.

An even further object of the invention is to provide a pest control system that works with a plurality of shop vacuum-styled vacuum cleaners.

A further object of the invention is to provide a tube of an undefined length that attaches to the hose of the existing vacuum cleaner, and includes both a baiting means and sensing means so as to attract a pest therein, and operating the existing vacuum cleaner upon detection.

An object of the invention is to provide the sensing means with a plug that can attach to a standard wall outlet, and which is wiredly engaged with a switch such that upon detection of a pest shall deliver electricity to the existing vacuum cleaner via a second plug.

An object of the invention is to provide a tube of clear construction.

An even further object of the invention is to provide a baiting means that can be accessed to replace and interchange different types of baits.

These together with additional objects, features and advantages of the automated vacuum-based pest control system will be readily apparent to those of ordinary skill in the art upon reading the following detailed description of presently preferred, but nonetheless illustrative, embodiments of the automated vacuum-based pest control system when taken in conjunction with the accompanying drawings.

In this respect, before explaining the current embodiments of the automated vacuum-based pest control system in detail, it is to be understood that the automated vacuum-based pest control system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the automated vacuum-based pest control system.

It is therefore important that the claims be regarded as including such equivalent construction insofar as they do not depart from the spirit and scope of the automated vacuum-based pest control system. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
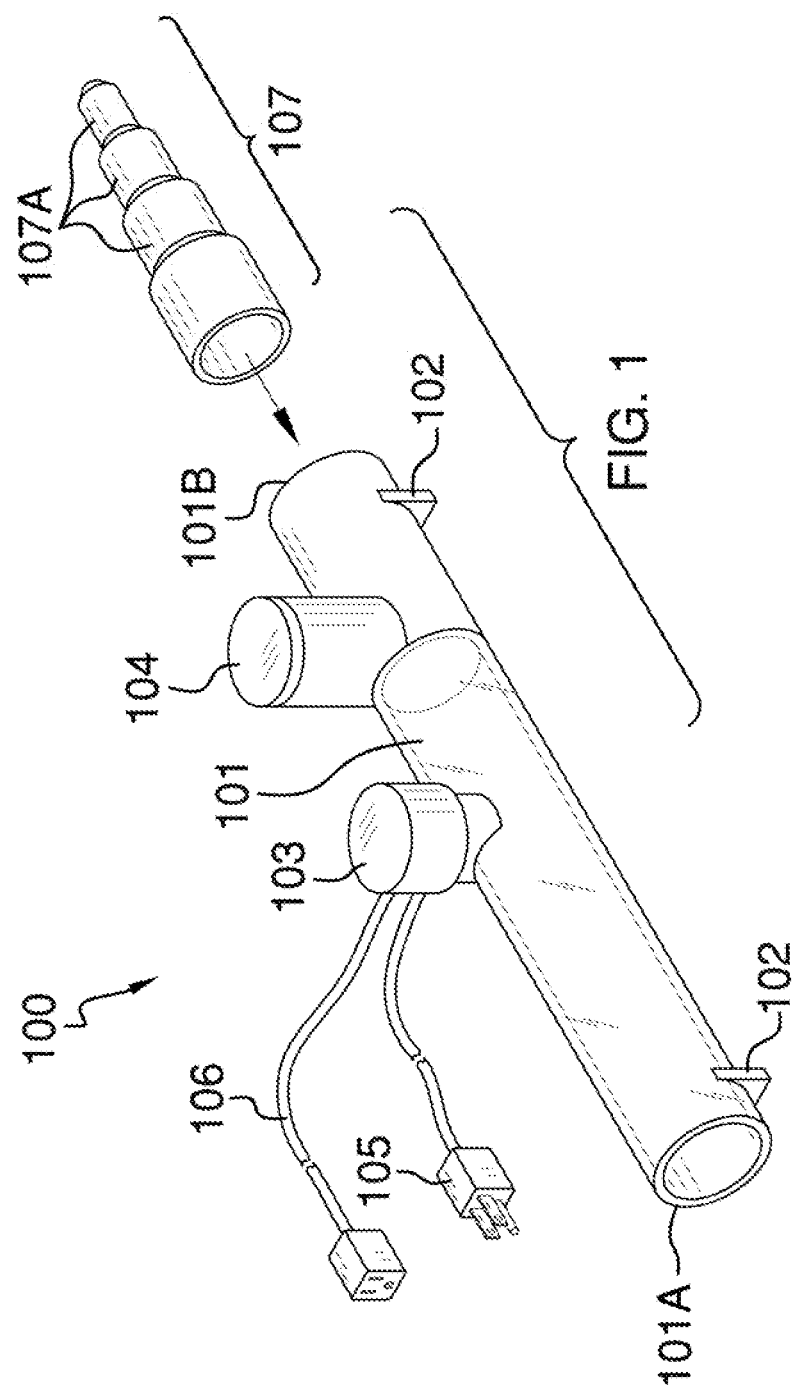
FIG. 1 illustrates a perspective view of the automated vacuum-based pest control system with an hose adapter and vacuum hose aligned adjacent the second entrance to the tube.
Figure 2:
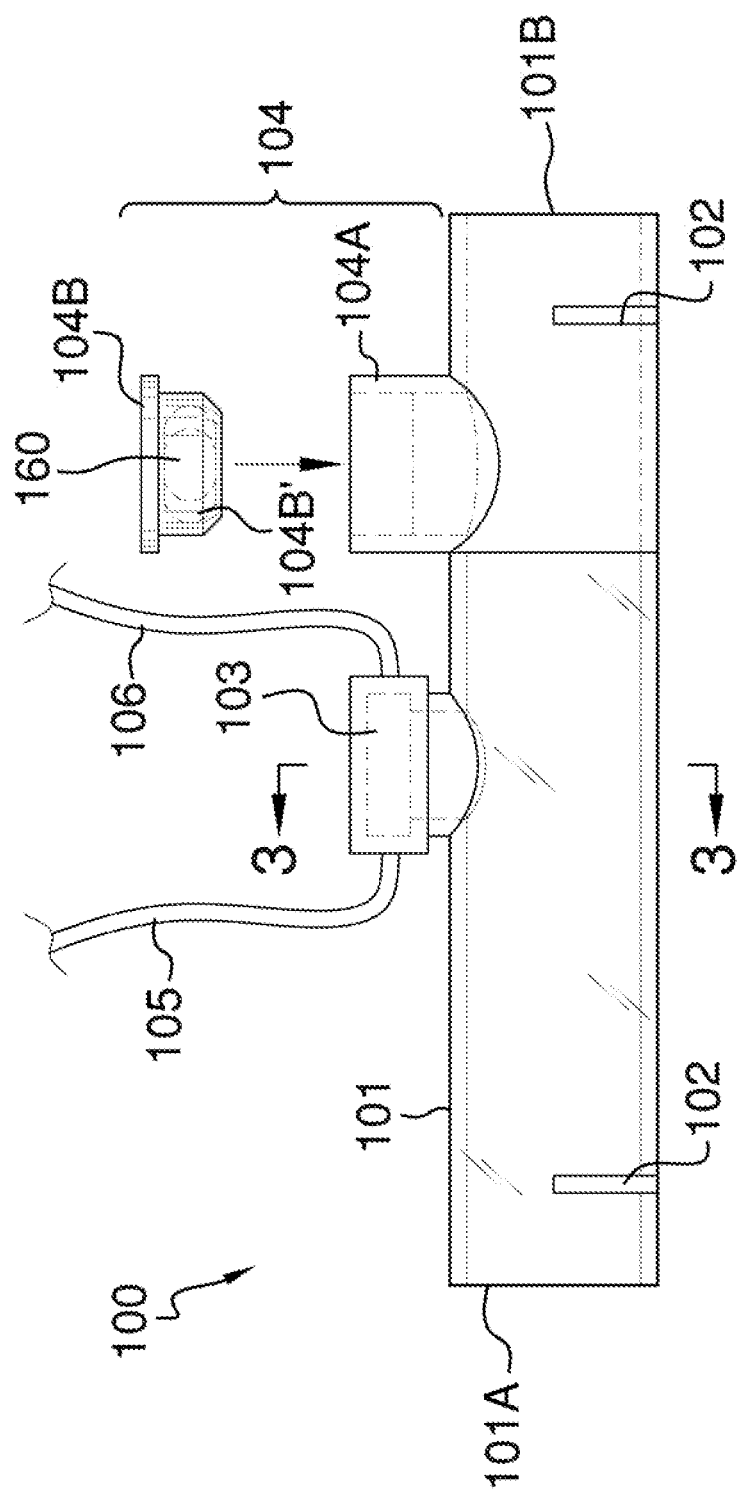
FIG. 2 illustrates a side view of the automated vacuum-based pest control system by itself and in which the bait tube cap is aligned above the bait tube in order to illustrate the accessibility of the baiting means.
Figure 3:
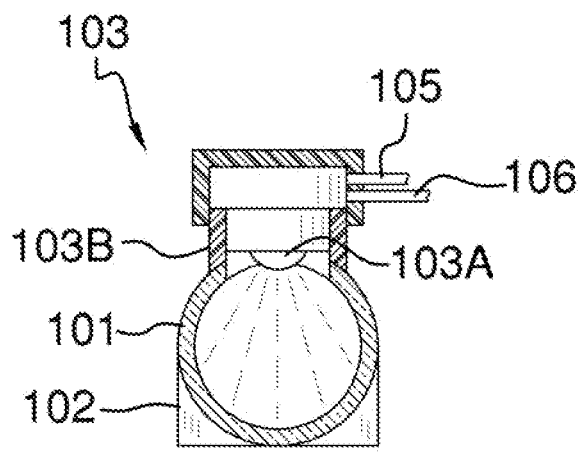
FIG. 3 illustrates a cross-sectional view of the automated vacuum-based pest control system along line 3-3 in FIG. 2, and depicting the sensing means in use as illustrated by lines radiating from a top, interior portion of said tube, while providing further detail surrounding the applicable plugs that extend from the sensing means.
Figure 4:
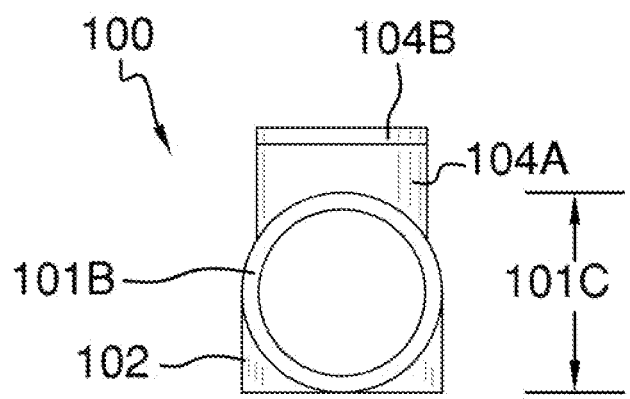
FIG. 4 illustrates a rear end view of the automated vacuum-based pest control system wherein the bait tube cap is installed onto the bait tube, which is perpendicularly oriented with respect to the tube while further detailing the stabilizer feet used to support the tube.
Figure 5:
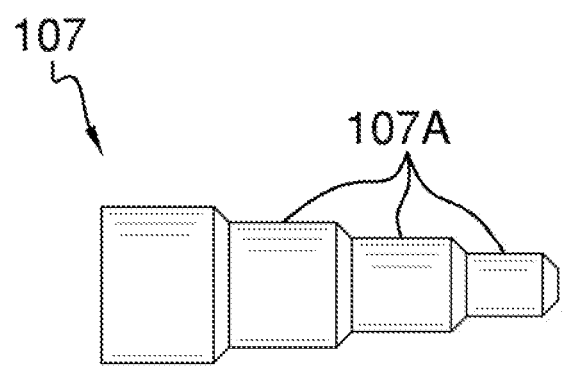
FIG. 5 illustrates a view of the hose adaptor, which may be used to attach the tube to a plurality of hose sizes, and which enables use with a plurality of vacuum cleaners.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-6. An automated vacuum-based pest control system 100 (hereinafter invention) includes a tube 101, which is of an unspecified length, and further defined by a first entrance 101A and a second entrance 101B. The tube 101 may be completely or mostly composed of a clear material. The tube 101 shall have an internal diameter 101C that shall range from no less than 1 inch to not more than 4 inches.

The tube 101 includes at least one stabilizer foot 102 that adorn a bottom, exterior surface, and which enable the tube 101 to be supported on a flat ground surface. It shall be noted that the stabilizer foot 102 prevents unwanted rolling or movement of the tube 101 when in use.

Located nearer the first entrance 101A is a sensing means 103; whereas located nearer the second entrance 101B is a baiting means 104. It shall be noted that the term "nearer" is being used to refer to a location along the length of the tube 101. When traveling down the tube 101 from the first entrance 101A, the sensing means 103 is encountered before the baiting means 104.

The sensing means 103 includes a sensor 103A that is located along a top, interior surface of the tube 101, and which is housed within a sensing means tube 103B. The sensing means housing 103B is perpendicularly-adjoined to the tube 101. The sensor 103A may be of a type comprising a motion-based sensor or a thermal-based sensor. The sensor 103A shall either detect the presence of a pest 130 either by motion or by the heat signature of the pest 130.

Figure 6:
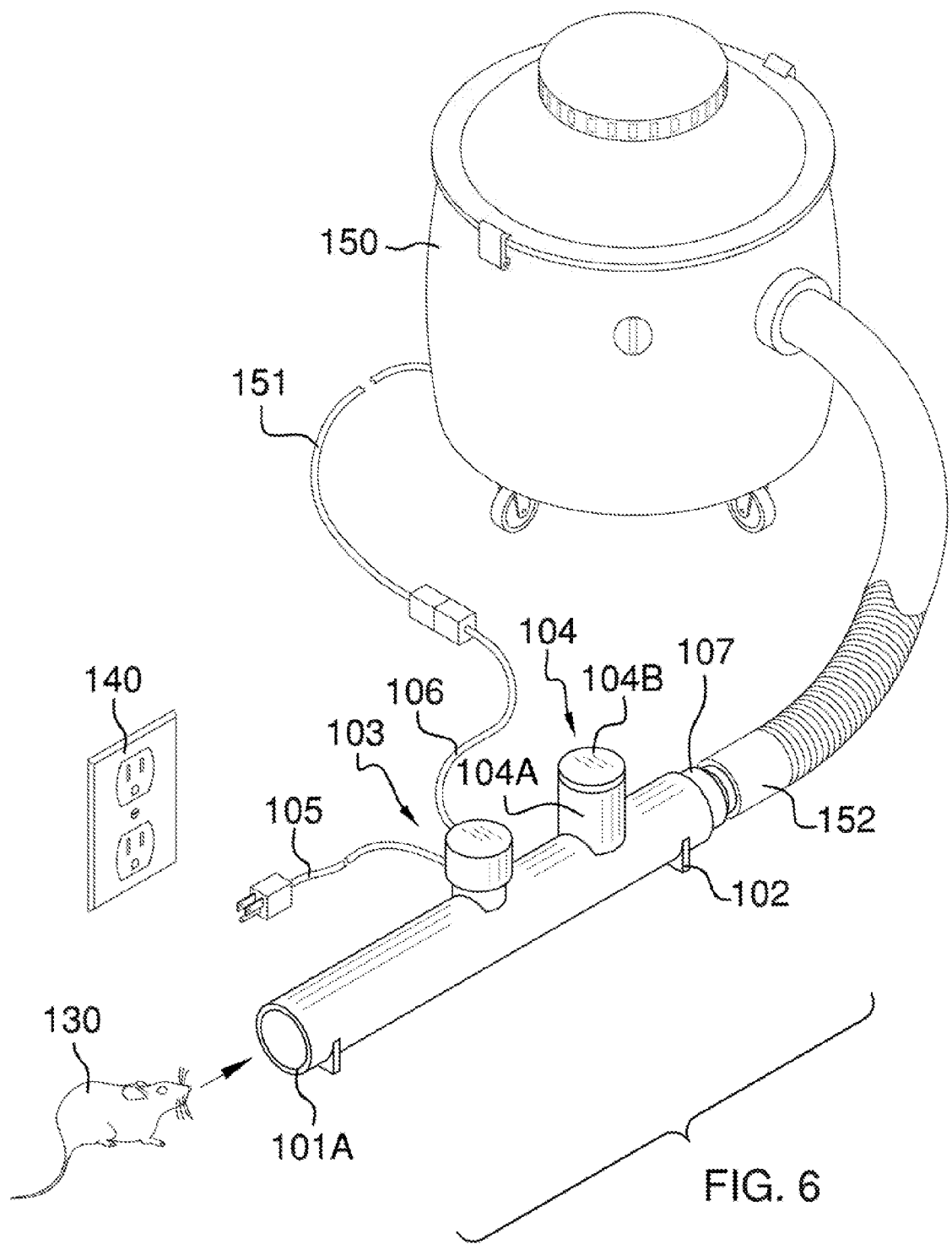
FIG. 6 illustrates a perspective view of the automated vacuum-based pest control system in use with a vacuum cleaner of a shop-vac ilk and further depicting the second plug being wiredly engaged with the plug of the vacuum cleaner while depicting an arrow adjacent the first entrance.

The sensor 103A is in wired connection with a first plug 105 that is of an undefined length, and which can plug into a standard wall outlet 140. The sensor 103A is both powered via the first plug 105 and controls electricity to a second plug 106. The second plug 106 is also of an undefined length and features a female-styled plug, which can be plugged with a vacuum cleaner 150. Referring to FIG. 6, the vacuum cleaner 150 includes a power cord 151, which simply plugs into the second plug 106.

It shall be noted that the vacuum cleaner 150 is depicted as a shop-vac styled vacuum cleaner. However, it shall be noted that the vacuum cleaner 150 may be of different styles. It shall be further noted that vacuum cleaners come in different sizes employing motors of different strengths, as is usually defined by the amperage. The vacuum cleaner 150 includes a vacuum hose 152. The vacuum hose 152 may involve different sizes that correspond with the different sized vacuum cleaners that are currently available on the market.

The invention 100 includes a hose adapter 107 that can attach to the second entrance 101B of the tube 101. The hose adapter 107 features a plurality of steps 107A having progressively smaller diameters, which enable attachment with vacuum hoses 152 of different sizes.

The baiting means 104 includes a baiting means tube 104A, which is perpendicularly adjoined to a top surface of the housing 101. The baiting means tube 104A is enclosed via a bait tube cap 104B. The bait tube cap 104B includes a hollow recess 104B', which provides a location into which a bait 160 may be placed. It shall be noted that the bait 160 is ideally a peanut butter that is simply spread across the interior of the hollow recess 104B', and which attracts the pest 130 into the tube 101.

In order to use the invention 100, the vacuum cleaner 150 is turned to an on position, and then plugged into the second plug 106. The bait 160 is placed in the bait tube cap 104B, which is then placed onto the baiting means tube 104A. Next, the first plug 105 is plugged into the standard wall outlet 140, and the invention 100 is set to catch the pest 130 upon detection via the sensing means 103.

It shall be noted that the sensor 103A may include a timer function, which turns on the power to the vacuum cleaner 150 for a defined amount of time via the second plug 106, and then subsequently turns off said power. The inclusion of the timer function insures that the invention 100 may be used indefinitely.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. An automated vacuum-based pest control system comprising:
   a tube including a sensing means and a baiting means;
   wherein a vacuum hose of an existing vacuum cleaner is connected to the tube and operated upon detection of a pest within the tube via the sensing means;
   wherein the sensing means includes a sensor that is located along a top, interior surface of the tube, and which is housed within a sensing means tube;
   wherein the sensor is of a type comprising a motion-based sensor or a thermal-based sensor;
   wherein the sensor is in wired connection with a first plug that is of an undefined length, and which can plug into a standard wall outlet; wherein the sensor is both powered via the first plug and controls electricity to a second plug; wherein the second plug is also of an undefined length and features a female-styled plug, which can be plugged with a power cord of the vacuum cleaner; wherein the vacuum cleaner is turned to an on setting and is operated once the sensor detects said pest;
   wherein the sensor includes a timer function, which turns on the power to the vacuum cleaner for a defined amount of time via the second plug, and then subsequently turns off said power.

2. The automated vacuum-based pest control system as described in claim 1 wherein the tube is of an unspecified length, defined by a first entrance, and a second entrance.

3. The automated vacuum-based pest control system as described in claim 2 wherein the tube has an internal diameter ranging from 1 inch to 4 inches.

4. The automated vacuum-based pest control system as described in claim 2 wherein the sensing means is nearer the first entrance whereas the baiting means is nearer the second entrance.

5. The automated vacuum-based pest control system as described in claim 2 wherein a hose adapter attaches to the second entrance of the tube; wherein the hose adapter includes a plurality of steps having progressively smaller diameters, which enable attachment with vacuum hoses of different sizes.

6. The automated vacuum-based pest control system as described in claim 1 wherein the tube includes at least one stabilizer foot that adorns a bottom, exterior surface of the tube, and which supports the tube on a ground surface.

7. The automated vacuum-based pest control system as described in claim 1 wherein the sensing means tube is perpendicularly-adjoined to the tube.

8. The automated vacuum-based pest control system as described in claim 1 wherein the baiting means includes a baiting means tube, which is perpendicularly adjoined to a top surface of the housing, and which is enclosed via a bait tube cap; wherein the bait tube cap includes a hollow recess that provides a location into which a bait may be placed.

9. An automated vacuum-based pest control system comprising:
   a tube including a sensing means and a baiting means which are both positioned between a first entrance and a second entrance of the tube;
   wherein the sensing means is nearer the first entrance whereas the baiting means is nearer the second entrance;
   wherein a vacuum hose of an existing vacuum cleaner is connected to the tube and operated upon detection of a pest within the tube via the sensing means;
   wherein the sensing means includes a sensor that is located along a top, interior surface of the tube, and which is housed within a sensing means tube; wherein the sensing means tube is perpendicularly-adjoined to the tube; wherein the sensor is of a type comprising a motion-based sensor or a thermal-based sensor;
   wherein the sensor is in wired connection with a first plug that is of an unspecified length, and which can plug into a standard wall outlet; wherein the sensor is both powered via the first plug and controls electricity to a second plug; wherein the second plug is also of an unspecified length and features a female-styled plug, which can be plugged with a power cord of the vacuum cleaner; wherein the vacuum cleaner is turned to an on setting and is operated once the sensor detects said pest;
   wherein the sensor includes a timer function, which turns on the power to the vacuum cleaner for a defined amount of time via the second plug, and then subsequently turns off said power.

10. The automated vacuum-based pest control system as described in claim 9 wherein the tube has an internal diameter ranging from 1 inch to 4 inches.

11. The automated vacuum-based pest control system as described in claim 9 wherein the tube includes at least one stabilizer foot that adorns a bottom, exterior surface of the tube, and which supports the tube on a ground surface.

12. The automated vacuum-based pest control system as described in claim 9 wherein a hose adapter attaches to the second entrance of the tube; wherein the hose adapter includes a plurality of steps having progressively smaller diameters, which enable attachment with vacuum hoses of different sizes.

13. The automated vacuum-based pest control system as described in claim 9 wherein the baiting means includes a baiting means tube, which is perpendicularly adjoined to a top surface of the housing, and which is enclosed via a bait tube cap; wherein the bait tube cap includes a hollow recess that provides a location into which a bait may be placed.

* * * * *